UNITED STATES PATENT OFFICE.

GEORGE W. L. MARSDEN, OF WILMINGTON, DELAWARE, ASSIGNOR TO HIMSELF, AND EDGAR H. ANDRESS, OF NEWARK, NEW JERSEY.

DRY PAINT COMPOSITION.

SPECIFICATION forming part of Letters Patent No. 341,761, dated May 11, 1886.

Application filed June 15, 1885. Serial No. 168,785. (Specimens.)

*To all whom it may concern:*

Be it known that I, GEORGE W. L. MARSDEN, of Wilmington, in the county of New Castle and State of Delaware, have invented a new and Improved Dry Paint Composition, of which the following is a full, clear, and exact description.

My composition consists of the following ingredients, combined substantially in the proportions stated: Red or white lead, sixty-five per cent.; pulverized mineral fiber, thirty-five per cent.

The above ingredients are to be thoroughly mixed and reduced to a proper consistence for application by the addition of turpentine and linseed-oil combined in the usual proportions.

The term "mineral fiber," as employed in the above formula, is generic, and covers all such substances as mineral wool, slag-wool, rock-wool, silicate-cotton, ground glass, &c.

By the use of such a composition I obtain a paint that is highly impervious to the action of the atmosphere and all other destroying elements, and consequently a paint that is well adapted for use on all outside surfaces.

I do not limit myself to lead, as any other substance to form the body of the paint would do as well.

Having thus described my invention, what I claim as new, and desire to secure by Letters Patent, is—

The herein-described composition of matter, consisting of red or white lead and mineral wool, in about the proportions specified.

GEORGE W. L. MARSDEN.

Witnesses:
 DAVID J. WILSON,
 JOSEPH W. VANDEGRIFT.